(12) United States Patent
Haq et al.

(10) Patent No.: US 10,836,952 B2
(45) Date of Patent: Nov. 17, 2020

(54) OIL RECOVERY METHODS USING CARBOXYLATED PYROLYZED DATE LEAVES

(71) Applicant: King Fahd University of Petroleum and Minerals, Dhahran (SA)

(72) Inventors: Bashirul Haq, Dhahran (SA); Abdul Aziz, Dhahran (SA); Abbas Saeed Hakeem, Dhahran (SA); Dhafer A. Al Shehri, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/540,485

(22) Filed: Aug. 14, 2019

(65) Prior Publication Data

US 2020/0056086 A1 Feb. 20, 2020

Related U.S. Application Data

(60) Provisional application No. 62/718,706, filed on Aug. 14, 2018.

(51) Int. Cl.
*E21B 43/16* (2006.01)
*C09K 8/58* (2006.01)

(52) U.S. Cl.
CPC ............ *C09K 8/58* (2013.01); *E21B 43/16* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 9,346,678 B1 | 5/2016 | Alshehri et al. | |
| 9,896,342 B1 | 2/2018 | Alshatwi et al. | |
| 2015/0004415 A1 | 1/2015 | Biswal et al. | |
| 2017/0110719 A1 | 4/2017 | Wang et al. | |
| 2019/0101502 A1 | 4/2019 | Aziz | |

FOREIGN PATENT DOCUMENTS

| | | |
|---|---|---|
| CN | 105688856 A | 6/2016 |
| CN | 105858634 B | 12/2017 |

OTHER PUBLICATIONS

Haq, et al. ; Date-Leaf Carbon Micro-Nanostructured Particles DLCMNPs for Enhance Oil Recovery ; SPE Middle East Oil and Gas Show and Conference ; Mar. 18-21, 2019 ; Abstract Only ; 3 Pages.

(Continued)

*Primary Examiner* — Andrew Sue-Ako
(74) *Attorney, Agent, or Firm* — Oblon, McClelland, Maier & Neustadt, L.L.P.

(57) ABSTRACT

A method of recovering a hydrocarbon from a reservoir, whereby an oil recovery formulation containing carboxylic acid functionalized-pyrolyzed date leaf particles is injected into the reservoir, and the hydrocarbon is collected from the reservoir. The carboxylic acid functionalized-pyrolyzed date leaf particles are obtained sequentially from date leaves by cutting the date leaves and drying, pulverizing in the presence of a metal bicarbonate, pyrolyzing at 700 to 1,000° C., and treating the product thus obtained with an acid solution that includes nitric acid to introduce carboxylic acid functional groups.

20 Claims, 6 Drawing Sheets

(56) References Cited

OTHER PUBLICATIONS

Xu, et al. ; Alkali-assisted hydrothermal route to control submicron-sizednanoporous carbon spheres with uniform distribution; Colloids and Surfaces A: Physciochem. Eng. Aspect 515; pp. 1-11; Dec. 2, 2016; 12 Pages.

Zhang, et al. ; Carboxylated mesoporous carbon microparticles as new approach to improve the oral bioavailability of poorly water-soluble carvedilol; International Journal of Pharmaceutics 454 ; pp. 403-411; Jul. 12, 2013 ; 9 Pages.

Aziz, et al.; A Simple and Direct Preparation of a Substrate-Free Interconnected Nanostructured Carbon Electrode from Date Palm Leaflets for Detecting Hydroquinone; ChemistrySelect, vol. 2, Issue 17; Jun. 14, 2017 ; Abstract Only; 3 Pages.

Li, et al.; Hierarchical porous carbon microspheres with superhydrophilic surface for efficient adsorption and detection of water-soluble contaminants; Journal of Materials Chemistry A, Issue 25; 2018; 7 Pages.

OIL RECOVERY METHODS USING CARBOXYLATED PYROLYZED DATE LEAVES

CROSS REFERENCE TO RELATED APPLICATIONS

This application claims the benefit of priority of U.S. Provisional Application No. 62/718,706 filed Aug. 14, 2018, the entire contents of which are incorporated herein by reference.

BACKGROUND OF THE INVENTION

Technical Field

The present disclosure relates to a method for oil recovery. More specifically, the present disclosure relates to a method for enhanced oil recovery using an oil recovery formulation that includes carboxylic acid functionalized-pyrolyzed date leaf particles.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Carbon materials such as graphene, carbon nanotubes, carbon nanofibers, and glassy carbon micro/nano-spheres are widely used in various applications such as electrochemical applications, solar cells, fuel cells, drug delivery, biomedical applications, and oilfield applications. However, such carbonaceous materials are very expensive, hampering their utility, especially on industrial scale. Therefore, there is a need for new carbonaceous materials that can be obtained from inexpensive sources, particularly from biomass/agro-waste sources. For example, a huge amount of date leaves (a biomass) are produced each year in Asia, the Kingdom of Saudi Arabia, and many other locations.

While there are many examples of using biomass for combating/preventing circulation loss in drilling fluids, carbonaceous materials obtained from these biomass sources which are suitable for altering hydrocarbon/formation properties such as the interfacial tension (IFT), the rock wettability, and rheology for enhanced/supplemental oil recovery efforts, have not been identified.

In view of the forgoing, one objective of the present disclosure is to provide a method of recovering hydrocarbons from a reservoir with an oil recovery formulation that includes carboxylic acid functionalized-pyrolyzed date leaf particles.

BRIEF SUMMARY OF THE INVENTION

According to a first aspect, the present disclosure relates to a method of recovering a hydrocarbon from a reservoir that involves injecting an oil recovery formulation into the reservoir, wherein the oil recovery formulation includes carboxylic acid functionalized-pyrolyzed date leaf particles, and collecting the hydrocarbon from the reservoir.

In some embodiments, the carboxylic acid functionalized-pyrolyzed date leaf particles are obtained sequentially from date leaves by cutting the date leaves and drying at 90 to 140° C., pulverizing in the presence of a metal bicarbonate, pyrolyzing at 700 to 1,000° C. to form pyrolyzed date leaf particles, and treating the pyrolyzed date leaf particles with an acid solution comprising nitric acid to introduce carboxylic acid functional groups and form the carboxylic acid functionalized-pyrolyzed date leaf particles.

In some embodiments, the carboxylic acid functionalized-pyrolyzed date leaf particles are in the form of microparticles having an average particle size of 2 to 20 µm.

In some embodiments, the microparticles are composed of nanostructured sheets having an average particle size of 50 to 500 nm.

In some embodiments, the carboxylic acid functionalized-pyrolyzed date leaf particles comprise 65 to 75 wt. % carbon, 15 to 25 wt. % oxygen, and 0.3 to 1.5 wt. % silicon, each based on a total weight of the carboxylic acid functionalized-pyrolyzed date leaf particles.

In some embodiments, the carboxylic acid functionalized-pyrolyzed date leaf particles have a degree of carboxylic acid functionalization of 4 to 18 wt. %, as determined by X-ray photoelectron spectroscopic analysis.

In some embodiments, the carboxylic acid functionalized-pyrolyzed date leaf particles are porous with a hierarchical pore structure.

In some embodiments, the carboxylic acid functionalized-pyrolyzed date leaf particles have an average pore diameter of 1 to 10 nm.

In some embodiments, the carboxylic acid functionalized-pyrolyzed date leaf particles have a solubility in water of 0.1 to 5 mg per mL of water.

In some embodiments, the carboxylic acid functionalized-pyrolyzed date leaf particles are present in the oil recovery formulation in an amount of 50 to 1,000 ppm, based on a total weight of the oil recovery formulation.

In some embodiments, the carboxylic acid functionalized-pyrolyzed date leaf particles have a critical micelle concentration in water of 500 to 700 ppm.

In some embodiments, besides the carboxylic acid functionalized-pyrolyzed date leaf particles, the oil recovery formulation is substantially free of carbonaceous materials.

In some embodiments, the oil recovery formulation is substantially free of an organic solvent, an acrylamide-based polymer, and a surfactant.

In some embodiments, the oil recovery formulation further comprises at least one additive selected from the group consisting of a viscosity modifying agent, a chelating agent, a stabilizing agent, a dispersing agent, a corrosion inhibitor, a scale inhibitor, a defoaming agent, and an emulsifier.

In some embodiments, the oil recovery formulation further comprises an aqueous base fluid having a total dissolved solids content of less than 1,000 mg/L.

In some embodiments, the oil recovery formulation further comprises an aqueous base fluid having a total dissolved solids content of 10,000 mg/L to 400,000 mg/L.

In some embodiments, the reservoir has a temperature of 20 to 300° C.

In some embodiments, the reservoir is a carbonate reservoir.

In some embodiments, the hydrocarbon is an Arab Light crude oil and the method is an enhanced oil recovery method.

In some embodiments, the injecting forms a mixture of the oil recovery formulation and the Arab Light crude oil with an interfacial tension of 8 to 13 dyne/cm.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments of the present disclosure will now be described more fully hereinafter with reference to the accompanying drawings, in which some, but not all embodiments of the disclosure are shown.

Definitions

As used herein, the terms "optional" or "optionally" means that the subsequently described event(s) may or may not occur or the subsequently described component(s) may or may not be present (e.g. 0 wt. %).

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

The term "comprising" is considered an open-ended term synonymous with terms such as including, containing or having and is used herein to describe aspects of the invention which may (or may not) include additional components, functionality and/or structure. The term "consisting of" describes aspects of the invention in which only those features explicitly recited are included and thus other components not explicitly or inherently included are excluded.

As used herein, the words "a" and "an" and the like carry the meaning of "one or more."

As used herein, the term "comminuted" refers to a solid bulk piece of material which has been chopped, cut, milled, ground, pulverized, shredded, chipped, or otherwise reduced in size into several smaller pieces.

The term "nanostructured" as used herein refers to a material which is formed from an arrangement of nano-sized subparticles, which together form a larger particle morphology.

As used herein, "mesoporous" materials are those containing mesopores, that is, pores with a diameter between 2 to 50 nm. As used herein, "microporous" materials are those containing micropores, that is, pores with a diameter less than 2 nm. On the other hand, "macroporous" materials are those containing macropores, that is, pores with a diameter greater than 50 nm. A material which possesses two or more types of pore sizes (e.g., micropores and mesopores) is said to be a "hierarchical" material in the present disclosure.

As used herein, the term "fatty" describes a compound with a long-chain (linear) hydrophobic portion made up of hydrogen and anywhere from 6 to 26, 8 to 24, 10 to 22, 12 to 20, 14 to 18 carbon atoms, which may be fully saturated or partially unsaturated, and optionally attached to a polar functional group such as a hydroxyl group, an amine group, or a carboxyl group (e.g., carboxylic acid). Fatty alcohols, fatty amines, fatty acids, fatty esters, and fatty amides are examples of materials which contain a fatty portion, and are thus considered "fatty" compounds herein. For example, stearic acid, which has 18 carbons total (a fatty portion with 17 carbon atoms and 1 carbon atom from the —COOH group), is considered to be a fatty acid having 18 carbon atoms herein.

As used herein, "alkoxylated" or "alkoxylate" refers to compounds containing a (poly)ether group (i.e., (poly)oxyalkylene group) derived from reaction with, oligomerization of, or polymerization of one or more alkylene oxides having 2 to 4 carbon atoms, and specifically includes (poly)oxyethylene (derived from ethylene oxide, EO), (poly)oxypropylene (derived from propylene oxide, PO), and (poly)oxybutylene (derived from butylene oxide, BO), as well as mixtures thereof.

As used herein, the term "pore volume" or "PV" refers to the total volume in a reservoir that can be occupied by fluids. This term may be used as a measurement unit referring to the amount of fluid such as chemical fluid or aqueous solution that is injected into a reservoir during secondary and tertiary recoveries.

As used herein, "hydrocarbon", "petroleum", "crude oil", or "oil" may be used interchangeably to refer to materials originating from subterranean sources which are composed principally of hydrogen and carbon, with significantly smaller amounts (if any) of heteroatoms such as nitrogen, oxygen and sulfur. For example, crude oil (e.g., liquid petroleum) and natural gas (e.g., gaseous petroleum) are both hydrocarbons.

As used herein, the term "reservoir" or "petroleum reservoir" refers to a subterranean geological formation (e.g., formed from sedimentary rock) having sufficient porosity and permeability to store and transmit fluids (hydrocarbons). Both conventional and unconventional reservoirs are contemplated in the present disclosure.

Oil Recovery Formulation

The present disclosure generally relates to methods of recovering hydrocarbons from a reservoir, for example, in enhanced oil recovery (EOR) applications. The method generally involves use of an oil recovery formulation that contains or consists of date leaf carbon particles, specifically, carboxylic acid functionalized-pyrolyzed date leaf particles in an aqueous base fluid, and optionally an organic solvent, an acrylamide-based polymer, a surfactant, and/or one or more additive(s).

Carboxylic Acid Functionalized-Pyrolyzed Date Leaf Particles

*Phoenix dactylifera*, commonly known as date or date palm is a flowering plant species in the palm family, Arecaceae, cultivated for its edible sweet fruit known as a "date", which is a well-known staple food in North Africa, the Middle East and many other locations. Like other palm species such as oil palms and coconut palms, various parts of the date palm such as the trunk, the stems, the roots, the leaves (or frond or leaflet), the inflorescence, the fruit, the pulp, the empty fruit bunches, the seeds (date pit), the shells/husks of the seeds, the offshoot, etc. can be processed for different materials and for different purposes. The inventors have found that carbonaceous materials formed from pyrolysis of date leaves in particular, specifically date leaves which have been processed in a certain way to provide the carboxylic acid functionalized-pyrolyzed date leaf particles described below, can be used to enhance hydrocarbon recovery from oil reservoirs. Therefore, the carbonaceous materials produced from date leaves disclosed herein are different and distinct, in terms of both constitution and performance in the disclosed methods, from carbonaceous materials sourced from other parts of date palm plants, including, but not limited to, carbonaceous materials sourced from date palm trunk, stem, root, inflorescence, fruit ("date"), pulp, empty fruit bunches, seeds (date pit), shells/husks of the seeds, and offshoot, as well as carbonaceous materials sourced from other plants or agricultural products.

The carbonaceous materials employed in the methods herein are preferably obtained from pyrolysis of date leaves. Preferably, the carbonaceous materials employed in the methods herein are obtained from pyrolysis of date leaves followed by acid treatment to introduce carboxylic acid functional groups thereby forming "carboxylic acid functionalized-pyrolyzed date leaf particles". In preferred embodiments, the carboxylic acid functionalized-pyrolyzed date leaf particles are obtained sequentially from date leaves by cutting the date leaves and drying at 90 to 140° C., pulverizing in the presence of a metal bicarbonate, pyrolyzing at 700 to 1,000° C. to form pyrolyzed date leaf particles, and treating the pyrolyzed date leaf particles with an acid solution comprising nitric acid to introduce carboxylic acid functional groups and form the carboxylic acid functionalized-pyrolyzed date leaf particles. Briefly, the carboxylic acid functionalized-pyrolyzed date leaf particles may be formed according to the following procedure.

Fresh date leaves may be collected or otherwise obtained and cut/chopped into small pieces, and optionally rinsed/cleaned with water. The cut date leaves may then be dried, for example, in an oven at 90 to 140° C., preferably 95 to 130° C., preferably 100 to 120° C., preferably about 105 to 110° C., to reduce the moisture content to below 5 wt. %, preferably below 4 wt. %, preferably below 3 wt. %, preferably below 2 wt. %, preferably below 1 wt. %. The cut date leaves may be dried for any amount of time that provides an adequately dried product, typically, for drying times of 12 to 48 hours, preferably 16 to 36 hours, preferably 20 to 30 hours, preferably 24 hours.

The dried date leaves may next be pulverized using any suitable means, for example by grinding, ball milling, blending, etc. using manual methods (e.g., mortar) or machine-assisted methods such as using a mechanical blender or any other apparatus known to those of ordinary skill in the art. The dried date leaves are preferably pulverized until an average particle size of less than 50 μm, preferably less than 40 μm, preferably less than 30 μm, preferably less than 20 μm is achieved. In preferred embodiments, the dried date leaves are pulverized in the presence of a metal bicarbonate, including, but not limited to, sodium bicarbonate, potassium bicarbonate, cesium bicarbonate, magnesium bicarbonate, and calcium bicarbonate, preferably sodium bicarbonate. In preferred embodiments, the weight ratio of dried date leaves to metal bicarbonate ranges from 1:1 to 1:7, preferably 1:2 to 1:6, preferably 1:3 to 1:5, preferably 1:4.

The mixed powders (pulverized date leaves and metal bicarbonate powder) are next subject to pyrolysis, i.e., a process of thermochemical decomposition at elevated temperatures and in the absence of an oxidizing agent such as oxygen, hydrogen peroxide, and/or a halogen-containing gas (e.g., a chlorine-containing gas). In some embodiments, pyrolysis is performed in an inert gas (e.g., nitrogen, helium, neon, and/or argon), and in a temperature range of 700 to 1,000° C., preferably 725 to 975° C., preferably 750 to 950° C., preferably 775 to 925° C., preferably 800 to 900° C., preferably 825 to 875° C., preferably 850° C. Pyrolysis of the pulverized date leaves preferably forms a solid, for example a carbonaceous ash/char/tar that mainly contains carbon and heteroatoms (e.g. nitrogen, oxygen), along with silicon, and in some cases minor amounts of other elements and minerals such as Al, Fe, Ca, Mg, K, Na, and the like. The pyrolysis of the pulverized date leaves may also form volatile compounds, which may evaporate during the pyrolysis thus leaving behind the pyrolyzed date leaf particles. In some embodiments, pyrolysis may be performed by placing the mixed powders into a furnace such as a tube furnace, for example, in a ceramic crucible (e.g., an alumina crucible) or other form of containment, and heating to the temperatures described above. The furnace is preferably equipped with a temperature control system, which may provide a heating rate of up to 50° C./min, or preferably up to 40° C./min, or preferably up to 30° C./min, preferably up to 20° C./min, preferably up to 10° C./min, preferably up to 5° C./min. In preferred embodiments, the mixed powders are heated with a heating rate in the range of 1 to 15° C./min, preferably 3 to 10° C./min, preferably 5 to 6° C./min to an elevated temperature described above, and the powders are heated at such an elevated temperature (e.g., 850° C.) for 1 to 15 hours, preferably 2 to 10 hours, preferably 3 to 8 hours, preferably 4 to 6 hours, preferably 5 hours. Preferably, the mixed powders (pulverized date leaves and metal bicarbonate powder) are isothermally heated at the elevated temperature. The furnace may also be equipped with a cooling accessory such as a cooling air stream system, a liquid nitrogen stream system, which may provide a cooling rate of up to 20° C./min, or preferably up to 15° C./min, or preferably up to 10° C./min.

After pyrolysis, the resulting pyrolyzed date leaf particles (which may still be combined with the pyrolysis product formed from the metal bicarbonate) may be washed one or more times with a dilute aqueous acid solution to remove pyrolysis product formed from the metal bicarbonate (e.g., metal carbonate). In some embodiments, the dilute aqueous acid solution is 0.05 to 1 wt. % aqueous acid, preferably 0.1 to 0.7 wt. % aqueous acid, preferably 0.5 wt. % aqueous acid, where the acid may be a mineral acid (e.g., HCl, sulfuric acid, phosphoric acid, perchloric acid) or an organic acid (acetic acid, formic acid, citric acid), preferably HCl. The dilute acid wash may be followed by washing one or more times with water (DI water), and drying, for example, in an oven at 50 to 80° C., preferably 55 to 75° C., preferably 60 to 70° C., for 6 to 24 hours, preferably 8 to 20 hours, preferably 10 to 18 hours, preferably 12 to 16 hours to provide the pyrolyzed date leaf particles.

The carboxylic acid functionalized-pyrolyzed date leaf particles may then be formed by treating the pyrolyzed date leaf particles described above with an acid solution comprising nitric acid and optionally sulfuric acid. In some embodiments, the acid solution is a mixture of sulfuric acid (conc.) and nitric acid (conc.) in a volume ratio of 1:1 to 5:1, preferably 2:1 to 4:1, preferably 3:1. The concentration of the pyrolyzed date leaf particles in the acid solution may vary, but typical concentration values range from 1 to 4 g/mL, preferably 1.5 to 3 g/mL, preferably 2 to 2.5 g/mL (g of pyrolyzed date leaf particles per 1 mL of acid solution). The pyrolyzed date leaf particles may be treated with the acid solution using any known agitation method known to those of ordinary skill in the art, for example, via stirring, swirling, mixing, sonicating (e.g., ultrasonicating) for any amount of time needed to introduce an adequate carboxylic acid content. Typical treatment times may range from 1 to 12 hours, preferably 2 to 10 hours, preferably 3 to 8 hours, preferably 4 to 6 hours, preferably 5 hours. At the end of the treatment to introduce carboxylic acid functional groups, the reaction mixture may be diluted with water and held under static conditions to form separate layers of carboxylic acid functionalized-pyrolyzed date leaf particles and mother liquor. The mother liquor may be removed, for example via decantation, and the water dilution and decantation process may be repeated, for example, up to 6 times, after which the carboxylic acid functionalized-pyrolyzed date leaf particles may be dried at 50 to 80° C., preferably 55 to 75° C., preferably 60 to 70° C., for 12 to 48 hours, preferably 20 to 30 hours, preferably 24 to 26 hours.

In preferred embodiments, the carboxylic acid functionalized-pyrolyzed date leaf particles have a degree of carboxylic acid functionalization of 4 to 18 wt. %, preferably 5 to 17 wt. %, preferably 6 to 16 wt. %, preferably 7 to 15 wt. %, preferably 8 to 14 wt. %, preferably 9 to 13 wt. %, preferably 10 to 12 wt. %, as determined by X-ray photoelectron spectroscopic analysis.

The elemental constitution of the carboxylic acid functionalized-pyrolyzed date leaf particles may vary depending on a number of factors, such as the type of date palm tree cultivated, the source/location of the date palm tree cultivated, the pyrolysis conditions, as well as the post-pyrolysis processing, (e.g., the extent of carboxylic acid functional group installation). However, the carboxylic acid functionalized-pyrolyzed date leaf particles effective in the methods herein generally comprise:

carbon in an amount of 65 to 75 wt. %, preferably 66 to 74.5 wt. %, preferably 67 to 74 wt. %, preferably 68 to 73.5 wt. %, preferably 69 to 73 wt. %, preferably 70 to 72.5 wt. %, preferably 71 to 72 wt. %;

oxygen in an amount of 15 to 25 wt. %, preferably 16 to 24.5 wt. %, preferably 17 to 24 wt. %, preferably 18 to 23.5 wt. %, preferably 19 to 23 wt. %, preferably 20 to 22.5 wt. %, preferably 21 to 22 wt. %; and silicon in amount of 0.3 to 1.5 wt. %, preferably 0.4 to 1.2 wt. %, preferably 0.5 to 1 wt. %, preferably 0.6 to 0.8 wt. %, each based on a total weight of the carboxylic acid functionalized-pyrolyzed date leaf particles; and in some cases minor amounts of one or more of Al, Fe, Ca, Mg, K, Na and the like.

As the composition of date palm leaves generally differs from the composition of other date palm plant parts (e.g., date palm trunk, date palm pits, etc.) and other plants or agricultural products, the carboxylic acid functionalized-pyrolyzed date leaf particles obtained from the date palm leaves processing steps described above generally have a different composition from carbonaceous materials obtained from the pyrolysis/treatment of other plants or agricultural products, such as those made from date palm plant parts other than date palm leaves.

In some embodiments, the carboxylic acid functionalized-pyrolyzed date leaf particles are in the form of microparticles (solid) having an average particle size of 2 to 20 µm, preferably 3 to 19 µm, preferably 4 to 18 µm, preferably 5 to 17 µm, preferably 6 to 16 µm, preferably 7 to 15 µm, preferably 8 to 14 µm, preferably 9 to 13 µm, preferably 10 to 12 µm, wherein the average particle size is measured using the longest linear dimension of the particles. Preferably, the microparticles are composed of nanostructured subparticles having an average particle size of 50 to 500 nm, preferably 60 to 450 nm, preferably 70 to 400 nm, preferably 80 to 350 nm, preferably 90 to 300 nm, preferably 100 to 250 nm, preferably 110 to 200 nm, preferably 120 to 150 nm. While the subparticles may be formed in various morphologies, in preferred embodiments, the subparticles have a nanosheet morphology. Likewise, the microparticles may be formed in a variety of shapes/morphologies, preferably the microparticles are in the form of randomly shaped angular particles.

Figure 1A:
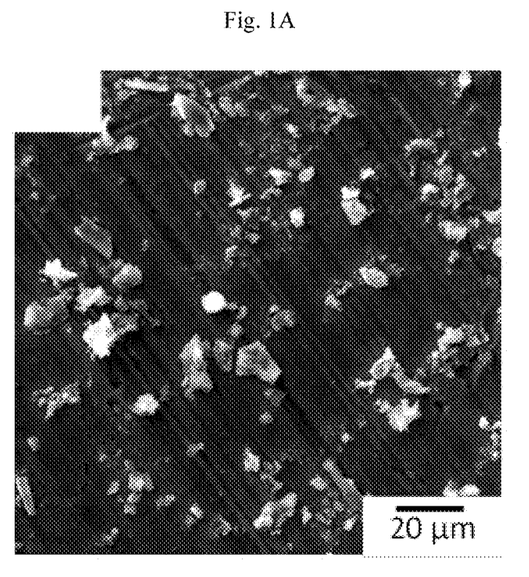
FIG. 1A is an FESEM image of carboxylated date-leaf carbon micro-nanostructured carbon particles (CDLCM-NPs)
Figure 1B:
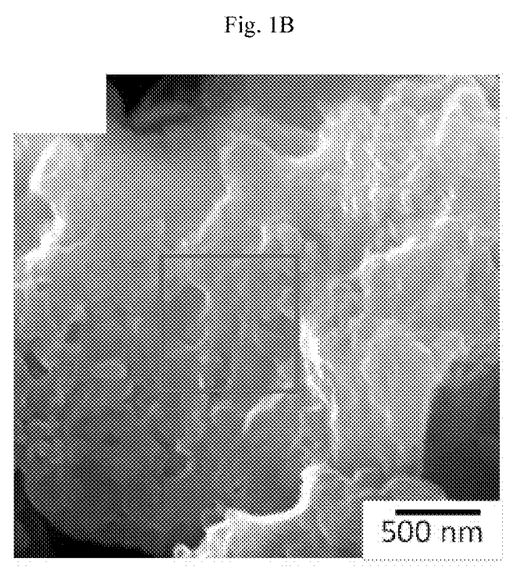
FIG. 1B is an expanded view of the FESEM image of FIG. 1A.

In preferred embodiments, the carboxylic acid functionalized-pyrolyzed date leaf particles are composed of nanostructured nanosheets which are arranged/agglomerated to form microsized particles as shaped angular particles (see FIGS. 1A and 1B).

The carboxylic acid functionalized-pyrolyzed date leaf particles are preferably porous. In some embodiments, the carboxylic acid functionalized-pyrolyzed date leaf particles contain mesopores. In some embodiments, the carboxylic acid functionalized-pyrolyzed date leaf particles contain micropores. In preferred embodiments, the carboxylic acid functionalized-pyrolyzed date leaf particles have a hierarchical pore structure and contain both mesopores and micropores. In preferred embodiments, the carboxylic acid functionalized-pyrolyzed date leaf particles have a hierarchical pore structure with an average pore size of 1 to 10 nm, preferably 1.5 to 9 nm, preferably 1.8 to 8 nm, preferably 2 to 7 nm, preferably 2.5 to 6 nm, preferably 3 to 5.5 nm, preferably 3.5 to 5 nm, preferably 4 to 4.5 nm. In some embodiments, the carboxylic acid functionalized-pyrolyzed date leaf particles have a specific pore volume of 0.1 to 1.0 $cm^3/g$, preferably 0.3 to 0.9 $cm^3/g$, preferably 0.5 to 0.8 $cm^3/g$. In some embodiments, the carboxylic acid functionalized-pyrolyzed date leaf particles have a BET surface area of 150 to 300 $m^2/g$, preferably 160 to 280 $m^2/g$, preferably 180 to 250 $m^2/g$, preferably from 190 to 220 $m^2/g$.

One advantage of introducing carboxylic acid functionality to the carboxylic acid functionalized-pyrolyzed date leaf particles in post-pyrolysis processing is that the introduction of such polar functionality improves the aqueous solubility of the carbonaceous date leaf material. Use of at least partially soluble materials may be important in oil recovery efforts because use of insoluble particulate materials may clog the pore-throats of the reservoir, which can lead to formation damage (Nelson, P. H. "Pore-throat sizes in sandstones, tight sandstones, and shales" Geologic Note, 2009, American Association of Petroleum Geologists Bulletin, 93 (3) pg. 329-340—incorporated herein by reference in its entirety). In some embodiments, the carboxylic acid functionalized-pyrolyzed date leaf particles used in the disclosed methods are at least partially soluble in water, and have an aqueous solubility (25° C.) of 0.1 to 5 mg per mL of water, preferably 0.5 to 5 mg per mL of water, preferably 1 to 4 mg per mL of water, preferably 1.5 to 3 mg per mL of water.

The carboxylic acid functionalized-pyrolyzed date leaf particles may be added to the oil recovery formulation in any amount sufficient to provide a desirable effect (e.g., interfacial tension (IFT) reduction, wettability alteration, rheology modification, etc.) for improved oil recovery from a reservoir. While the dosage of the carboxylic acid functionalized-pyrolyzed date leaf particles may vary depending on the particular material employed (e.g., date leaf source, pyrolysis conditions, treatment conditions and thus carboxylic acid content, etc.) and the oil and reservoir for example, the carboxylic acid functionalized-pyrolyzed date leaf particles are typically present in the oil recovery formulation in an amount of 50 to 1,000 ppm, preferably 100 to 950 ppm, preferably 200 to 900 ppm, preferably 250 to 850 ppm, preferably 300 to 800 ppm, preferably 350 to 750 ppm, preferably 400 to 700 ppm, preferably 450 to 675 ppm, preferably 500 to 650 ppm, preferably 550 to 625 ppm, preferably 575 to 600 ppm, based on a total weight of the oil recovery formulation. In some embodiments, the carboxylic acid functionalized-pyrolyzed date leaf particles have a critical micelle concentration (CMC) (i.e., the concentration above which micelles form and IFT tends to remain substantially constant) in water/oil mixtures (25° C.) of 500 to 700 ppm, preferably 510 to 690 ppm, preferably 520 to 680 ppm, preferably 530 to 670 ppm, preferably 540 to 660 ppm, preferably 550 to 650 ppm, preferably 560 to 640 ppm, preferably 570 to 630 ppm, preferably 580 to 620 ppm, preferably 590 to 610 ppm, preferably 600 ppm.

The oil recovery formulation may optionally be formulated to include carbonaceous materials such as graphene, graphene oxide, reduced graphene oxide, carbon nanotubes, carbon nanofibers, and glassy carbon micro/nano-spheres, as well as comminuted materials or carbonaceous materials sourced from other plants or agricultural products (besides the carboxylic acid functionalized-pyrolyzed date leaf particles). When present, such carbonaceous materials or comminuted or carbonaceous materials obtained from other plants or agricultural products may be present in the oil recovery formulation in an amount of up to 10 wt. %, preferably up to 8 wt. %, preferably up to 6 wt. %, preferably up to 4 wt. %, preferably up to 2 wt. %, preferably up to 1 wt. %, preferably up to 0.5 wt. %, preferably up to 0.1 wt. %, preferably up to 0.05 wt. %, preferably up to 0.01 wt. %, based on a total weight of the oil recovery formulation. Such comminuted materials or carbonaceous materials may be made from the husks, shells, stems, roots, leaves (or fronds or leaflets), cores, trunks, inflorescences, fruit, pulp, empty fruit bunches, seeds (pit), or the offshoots of various plants or agricultural products including, but not limited to, the seeds/nuts and/or seed/nut shells or hulls of almond, brazil, cocoa bean, coconut, cotton, flax, grass, linseed, maize, millet, oat, peach, apricot, date pit (e.g., date stones), peanut, rice, rye, soybean, sunflower, walnut, wheat; rice tips; rice straw; rice bran; rice husks; crude pectate pulp; peat moss fibers; flax; cotton; cotton linters; wool; sugar cane; jute stick; neem leaves; paper; bagasse; bamboo; corn stalks; wood (e.g., wood chips); wood pulp (that remain after wood processes (e.g., sawdust from sawmills or lumber yards); bark; straw (e.g., wheat straw); pine cone; cork; dehydrated vegetable matter; whole ground corn cobs; corn stalks; corn cob light density pith core; corn cob ground woody ring portion; corn cob chaff portion; cotton seed stems; flax stems; wheat stems; sunflower seed stems; soybean stems; maize stems; rye grass stems; millet stems; cellulosic fibers; cellulose; coconut palm materials (e.g., coconut shells); oil palm materials (e.g., palm oil fuel ash, palm oil fibers, palm oil shells, palm oil empty fruit brunches).

In preferred embodiment, the oil recovery formulation is substantially free of comminuted plant materials or agricultural products. In preferred embodiments, other than the carboxylic acid functionalized-pyrolyzed date leaf particles, the oil recovery formulation is substantially free of carbonaceous materials. In preferred embodiments, besides the carboxylic acid functionalized-pyrolyzed date leaf particles, the oil recovery formulation is substantially free of carbonaceous materials sourced from other plants or agricultural products. Preferably, the carboxylic acid functionalized-pyrolyzed date leaf particles are the only carbonaceous material present in the oil recovery formulation.

Aqueous Base Fluid

The oil recovery formulation also includes an aqueous base fluid. The aqueous base fluid may be fresh water, brackish water, saline or seawater, or brine solutions such as produced water (i.e., the aqueous fluid which flows back from the subterranean formation as a byproduct along with oil/gas). In some embodiments, the oil recovery formulation is formulated with an aqueous base fluid of fresh water (e.g., tap water, distilled water, aquifer water, river water, lake water, etc.) having a total dissolved solids (TDS) content of less than 1,000 mg/L, preferably less than 900 mg/L, preferably less than 800 mg/L, preferably less than 700 mg/L, preferably less than 600 mg/L, preferably less than 500 mg/L, preferably less than 400 mg/L, preferably less than 300 mg/L, preferably less than 200 mg/L, preferably less than 100 mg/L, preferably less than 50 mg/L, preferably less than 10 mg/L.

In some embodiments, the oil recovery formulation is formulated with an aqueous base fluid of brackish water (e.g., water from an estuary) having a total dissolved solids (TDS) content of 3,000 to less than 10,000 mg/L, preferably 4,000 to 9,000 mg/L, preferably 5,000 to 8,000 mg/L, preferably 6,000 to 7,000 mg/L.

In some embodiments, the oil recovery formulation is formulated with an aqueous base fluid of saline or brine (e.g., seawater, produced water, etc.) having a TDS content of 10,000 to 400,000 mg/L, preferably 20,000 to 350,000 mg/L, preferably 30,000 to 300,000 mg/L, preferably 40,000 to 250,000 mg/L, preferably 60,000 to 200,000 mg/L, preferably 80,000 to 150,000 mg/L, preferably 100,000 to 125,000 mg/L.

Representative examples of cations which may be optionally present in the aqueous base fluid include, but are not limited to, sodium, potassium, magnesium, calcium, strontium, barium, iron (ferrous and ferric), lead, copper, cobalt, manganese, nickel, zinc, aluminum, chromium, and titanium, as well as mixtures thereof. Representative examples of anions which may be optionally present in the aqueous base fluid include, but are not limited to, chloride, carbonate, bicarbonate, sulfate, bromide, iodide, acetate, hydroxide, sulfide, hydrosulfide, chlorate, fluoride, hypochlorite, nitrate, nitrite, perchlorate, peroxide, phosphate, phosphite, sulfite, hydrogen phosphate, hydrogen sulfate, as well as mixtures thereof.

In some embodiments, the aqueous base fluid is seawater having a salinity of 30,000 ppm to 36,000 ppm, preferably 31,000 ppm to 35,000 ppm, more preferably 32,000 ppm to 34,000 ppm. In some embodiments, the aqueous base fluid is natural seawater or simulated seawater having at least sodium ions present at a concentration of 5 to 40 g/L, preferably 10 to 30 g/L, preferably 18 to 20 g/L, calcium ions present at a concentration of 0.25 to 2 g/L, preferably 0.5 to 1.5 g/L, preferably 0.7 to 1 g/L, magnesium ions present at a concentration of 0.5 to 4 g/L, preferably 1 to 3 g/L, preferably 2 to 2.5 g/L, sulfate ions present at a concentration of 2 to 8 g/L, preferably 3 to 6 g/L, preferably 4 to 5 g/L, chloride ions present at a concentration of 15 g/L, preferably 20 to 40 g/L, preferably 30 to 35 g/L, and bicarbonate ions present at a concentration of 0.05 to 0.2 g/L, preferably 0.08 to 0.15 g/L, preferably 0.1 to 0.13 g/L.

Organic Solvent

The oil recovery formulation may also optionally include one or more organic solvents, for example, in amounts of 1 to 15 vol. %, preferably 2 to 10 vol. %, preferably 3 to 8 vol. %, preferably 4 to 6 vol. %, preferably 5 vol. %, based on a total volume of the oil recovery formulation. The organic solvent may be at least one selected from the group consisting of a polar aprotic solvent, an aromatic solvent, a terpene or a terpineol, a mono alcohol with 1 to 12 carbon atoms, and a polyol with 2 to 18 carbon atoms. Acceptable organic solvents include, but are not limited to, formamide, dimethyl formamide, dimethyl acetamide, acetone, methyl ethyl ketone, methanol, ethanol, propanol, isopropanol, n-butanol, isobutanol, n-pentanol, n-hexanol, terpineol (e.g., α-terpineol), α-pinene, d-limonene, nopol, eucalyptol, menthol, prenol, 3-methyl-3-buten-1-ol, 2-ethyl-1-hexanol, 2-ethyl-1-butanol, 2-propylheptan-1-ol, 2-butyl-1-octanol, ethylene glycol, diethylene glycol, triethylene glycol, tetraethylene glycol, ethylene glycol methyl ether, ethylene glycol ethyl ether, ethylene glycol propyl ether, ethylene glycol butyl ether, diethylene glycol monomethyl ether, diethylene glycol monoethyl ether, ethylene glycol monobutyl ether, propylene glycol, dipropylene glycol, propylene glycol monomethyl ether, pyrocatechol (1,2-benzenediol), resorcinol (1,3-benzenediol), phenol, cresol, benzyl alcohol, 1,3-propanediol, 1,3-butanediol, 2-butoxyethanol, 1,4-butanediol, 1,6-hexanediol, glycerol, pentaerythritol, manitol, sorbitol, as well as mixtures thereof.

In preferred embodiments, the oil recovery formulation is substantially free of organic solvent(s). In preferred embodiments, the oil recovery formulation is substantially free of terpenes and glycols/glycol ethers (e.g., ethylene glycol monobutyl ether).

Acrylamide-Based Polymer

The oil recovery formulation may optionally also include an acrylamide-based polymer. The acrylamide-based polymer may be an acrylamide homopolymer or a copolymer, and may contain reacted units of one or more of (meth)acrylamide, 2-acrylamido-2-methylpropane sulfonic acid (AMPS), N-vinylpyrrolidone, (meth)acrylic acid, N-methyl (meth)acrylamide, diacetone (meth)acrylamide, N-[3-(dimethylamino)propyl](meth)acrylamide, isopropylaminopropyl(meth)acrylamide, itaconic acid, and maleic acid, so long as at least one of the monomer subunits can be classified as an acrylamide. In some embodiments, the acrylamide-based polymer is a copolymer of acrylamide and 2-acrylamido-2-methylpropane sulfonic acid (AMPS), a copolymer of acrylamide and acrylic acid (e.g., partially-hydrolyzed polyacrylamide), or a terpolymer of acrylamide, 2-acrylamido-2-methyl-1-propanesulfonic acid, and N-vinylpyrrolidone. In some embodiments, the acrylamide-based polymer has a mass average molecular weight of 1,000 to 20,000 kDa, preferably 2,000 to 15,000 kDa, preferably 3,000 to 10,000 kDa, preferably 4,000 to 9,500 kDa, preferably 5,000 to 9,000 kDa, preferably 6,000 to 8,500 kDa, preferably 7,000 to 8,000 kDa.

In some embodiments, the acrylamide-based polymer is a copolymer of acrylamide and 2-acrylamido-2-methylpropane sulfonic acid (AMPS) having a molar ratio of acrylamide to 2-acrylamido-2-methylpropane sulfonic acid of 1:1 to 25:1, preferably 1:2 to 22:1, preferably 1:3 to 20:1, preferably 1:4 to 19:1, preferably 1:5 to 17:1, preferably 1:6 to 15:1, preferably 1:7 to 12:1, preferably 1:8 to 10:1.

In some embodiments, the acrylamide-based polymer has a 2-acrylamido-2-methylpropane sulfonic acid (AMPS) content of 3 to 40 mol %, preferably 5 to 35 mol %, preferably 8 to 30 mol %, preferably 10 to 20 mol %, relative to a total monomer content in the acrylamide-based polymer.

When employed, the acrylamide-based polymer may be generally present in the oil recovery formulation in an amount of up to 3 wt. %, preferably up to 2 wt. %, preferably up to 1 wt. %, preferably up to 0.5 wt. %, preferably up to 0.1 wt. %, preferably up to 0.05 wt. %, preferably up to 0.01 wt. %, preferably up to 0.005 wt. %, relative to a total weight of the oil recovery formulation.

In preferred embodiments, the oil recovery formulation is substantially free of an acrylamide-based polymer (e.g., a copolymer of acrylamide and 2-acrylamido-2-methylpropane sulfonic acid).

Surfactants

The oil recovery formulation may also optionally include one or more surfactants. The surfactant(s), when present, may be included in an amount of up to 5 wt. %, preferably up to 4 wt. %, preferably up to 3 wt. %, preferably up to 2 wt. %, preferably up to 1 wt. %, preferably up to 0.5 wt. %, preferably up to 0.1 wt. %, preferably up to 0.05 wt. %, preferably up to 0.01 wt. %, based on a total weight of the oil recovery formulation. Cationic, anionic, non-ionic, and/or amphoteric surfactants may be employed herein.

Cationic surfactants may include, but are not limited to
a protonated amine formed from a reaction between a $C_6$-$C_{26}$ alkyl amine compound and an acid (e.g., acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, hydrochloric acid, nitric acid, phosphoric acid, sulfuric acid, hydrobromic acid, perchloric acid, hydroiodic acid, etc.), such as protonated salts of $C_6$-$C_{26}$ alkyl monoamines, $C_6$-$C_{26}$ alkyl (poly)alkylene polyamines, and alkoxylated fatty amines;
a protonated $C_6$-$C_{26}$ alkyl amidoamine formed from a reaction between a $C_6$-$C_{26}$ alkyl amidoamine compound and an acid (for example the acids listed above), such as protonated forms of the amide reaction product between any fatty acid previously listed (or ester derivative thereof) with a polyamine (e.g., putrescine, cadaverine, ethylene diamine, $N^1,N^1$-dimethylethane-1,2-diamine, $N^1,N^1$-dimethylpropan-1,3-diamine, $N^1,N^1$-diethylethane-1,2-diamine, $N^1,N^1$-diethylpropane-1,3-diamine, spermidine, 1,1,1-tris(aminomethyl) ethane, tris(2-aminoethyl)amine, spermine, TEPA, DETA, TETA, AEEA, PEHA. HEHA, dipropylene triamine, tripropylene tetramine, tetrapropylene pentamine, pentapropylene hexamine, hexapropylene heptamine, dibutylene triamine, tributylene tetramine, tetrabutylene pentamine, pentabutylene hexamine, hexabutylene heptamine), with specific mention being made to protonated forms of stearamidopropyldimethylamine, stearamidopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylmine, behenamidoethyldiethylamine, behenamidoethyldimethylamine, arachidamidopropyldimethylamine, arachidamidopropyldiethylamine, arachidamidoethyldiethylamine, and arachidamidoethyldimethylamine; and a quaternary ammonium compound made from alkylation with suitable alkylating agents (e.g., dimethyl sulfate, methyl chloride or bromide, benzyl chloride or bromide, $C_6$-$C_{26}$ alkyl chloride or bromide, etc.) of a tertiary $C_6$-$C_{26}$ alkyl amine, an alkoxylated (tertiary) amine, or an aprotic nitrogenous heteroarene (optionally substituted) having at least one aromatic nitrogen atom with a reactive lone pair of electrons, with specific mention being made to a tri-fatty alkyl lower alkyl ammonium compound (e.g., trioctyl methyl ammonium chloride), a $C_{10}$-$C_{18}$ alkyl trimethyl ammonium chloride or methosulfate, a di-$C_{10}$-$C_{18}$ alkyl dimethyl ammonium chloride or methosulfate, a $C_{10}$-$C_{18}$ alkyl benzyl dimethyl ammonium chloride, a methyl quaternized $C_6$-$C_{22}$ alkyl propylene diamine, a methyl quaternized $C_6$-$C_{22}$ alkyl propylene triamine, a methyl quaternized $C_6$-$C_{22}$ alkyl propylene tetraamine, a N—$C_{10}$-$C_{18}$ alkyl pyridinium or a quinolinium bromide or chloride such as N-octyl pyridinium bromide, N-nonyl pyridinium bromide, N-decyl pyridinium bromide, N-dodecyl pyridinium bromide, N-tetradecyl pyridinium bromide, N-dodecyl pyridinium chloride, N-cyclohexyl pyridinium bromide, naphthyl methyl quinolinium chloride, naphthyl methyl pyridinium chloride, and cetylpyridinium chloride (for example those disclosed in CN101544903B—incorporated herein by reference in its entirety);

as well as mixtures thereof.

Anionic surfactants may include, but are not limited to:

sulfates, such as alkyl sulfates, alkyl-ester-sulfates, alkyl ether sulfates, alkyl-alkoxy-ester-sulfate, sulfated alkanolamides, glyceride sulfates, in particular, sulfates of fatty alcohols or polyoxyalkylene ethers of fatty alcohols such as sodium dodecyl sulfate, sodium laureth sulfate, ammonium lauryl sulfate, potassium lauryl sulfate, sodium myreth sulfate;

sulfonates such as alkyl sulfonates, fatty alkyl-benzene sulfonates, lower alkyl-benzene sulfonates, alpha olefin sulfonates, lignosulfonates, sulfo-carboxylic compounds, for example, dodecyl benzene sulfonate, dioctyl sodium sulfosuccinate, perfluorooctanesulfonate (PFOS), perfluorobutanesulfonate;

phosphates such as alkyl acyl ether phosphates, alkyl ether phosphates, phosphates of fatty alcohols or polyoxyalkylene ethers of fatty alcohols such as cetyl phosphate salts, dicetyl phosphate salts, ceteth-10-phosphate salts;

carboxylate salts of fatty acids, acylamino acids, lactylates, and/or fatty alcohols/polyoxyalkylene ethers of fatty alcohols such as sodium stearate, vegetable oil-based anionic surfactants (e.g., palm oil anionic surfactant), sodium behenoyl lactylate, sodium isostearoyl lactylate, sodium caproyl lactylate, sodium laureth-5 carboxylate, sodium laureth-6 carboxylate, sodium laureth-11 carboxylate;

and mixtures thereof.

Non-ionic surfactants may include, but are not limited to:

amides or alkanolamides of fatty acids, that is, amide reaction products between a fatty acid and an amine or alkanolamine compound, such as coconut fatty acid monoethanolamide (e.g., N-methyl coco fatty ethanol amide), coconut fatty acid diethanolamide, oleic acid diethanolamide, palm based oleylamine, and vegetable oil fatty acid diethanolamide;

alkoxylated alkanolamides of fatty acids, preferably ethoxylated and/or propoxylated variants of the alkanolamides of fatty acids using for example anywhere from 2 to 30 EO and/or PO molar equivalents, preferably 3 to 15 EO and/or PO molar equivalents, preferably 4 to 10 EO and/or PO molar equivalents, preferably 5 to 8 EO and/or PO molar equivalents per moles of the alkanolamide of the fatty acid (e.g., coconut fatty acid monoethanolamide with 4 moles of ethylene oxide);

amine oxides, such as N-cocoamidopropyl dimethyl amine oxide and dimethyl $C_6$-$C_{22}$ alkyl amine oxide (e.g., dimethyl coco amine oxide);

fatty esters, such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters;

ethers, such as (i) alkoxylated $C_1$-$C_{22}$ alkanols, which may include alkoxylated $C_1$-$C_5$ alkanols, preferably ethoxylated or propoxylated $C_1$-$C_5$ alkanols (e.g., dipropylene glycol n-butyl ether, tripropylene glycol n-butyl ether, dipropylene glycol methyl ether, tripropylene glycol methyl ether, diethylene glycol n-butyl ether, triethylene glycol n-butyl ether, diethylene glycol methyl ether, triethylene glycol methyl ether) and alkoxylated $C_6$-$C_{26}$ alkanols (including alkoxylated fatty alcohols), preferably alkoxylated $C_7$-$C_{22}$ alkanols, more preferably alkoxylated $C_8$-$C_{14}$ alkanols, preferably ethoxylated or propoxylated (e.g., cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, laureth-3, ceteareth-6, ceteareth-11, ceteareth-15, ceteareth-16, ceteareth-17, ceteareth-18, ceteareth-20, ceteareth-23, ceteareth-25, ceteareth-27, ceteareth-28, ceteareth-30, isoceteth-20, laureth-9/myreth-9, and PPG-3 caprylyl ether); (ii) alkoxylated polysiloxanes; (iii) ethylene oxide/propylene oxide copolymers (e.g., PPG-1-PEG-9-lauryl glycol ether, PPG-12-buteth-16, PPG-3-buteth-5, PPG-5-buteth-7, PPG-7-buteth-10, PPG-9-buteth-12, PPG-12-buteth-16, PPG-15-buteth-20, PPG-20-buteth-30, PPG-28-buteth-35, and PPG-33-buteth-45); and (iv) alkoxylated alkylphenols;

alkyl polyglycosides (APGs) such as those made from reaction between fatty alcohols and glucose;

and mixtures thereof.

Amphoteric surfactants may include, but are not limited to:

$C_6$-$C_{22}$ alkyl dialkyl betaines, such as fatty dimethyl betaines (R—N(CH$_3$)$_2$(+)— CH$_2$COO$^-$), obtained from a $C_6$-$C_{22}$ alkyl dimethyl amine which is reacted with a monohaloacetate salt (e.g., sodium monochloroacetate), such as $C_{12}$-$C_{14}$ dimethyl betaine (carboxylate methyl $C_{12}$-$C_{14}$ alkyl dimethylammonium);

$C_6$-$C_{22}$ alkyl amido betaines (R—CO—NH—CH$_2$CH$_2$CH$_2$—N(CH$_3$)$_2$(+)—CH$_2$COO$^-$ or R—CO—NH—CH$_2$CH$_2$—N(CH$_3$)$_2$(+)—CH$_2$COO$^-$), obtained by the reaction of a monohaloacetate salt (e.g., sodium monochloroacetate) with the reaction product of either dimethyl amino propylamine or dimethyl amino ethylamine with a suitable carboxylic acid or ester derivatives thereof, such as $C_{10}$-$C_{18}$ amidopropyl dimethylamino betaine;

$C_6$-$C_{22}$ alkyl sultaines or $C_6$-$C_{22}$ alkyl amido sultaines, which are similar to those $C_6$-$C_{22}$ alkyl dialkyl betaines or $C_6$-$C_{22}$ alkyl amido betaines described above except in which the carboxylic group has been substituted by a sulfonic group (R—N(CH$_3$)$_2$(+)—CH$_2$CH$_2$CH$_2$SO$_3^-$ or R—CO—NH—CH$_2$CH$_2$CH$_2$—N(CH$_3$)$_2$(+)—CH$_2$CH$_2$CH$_2$SO$_3^-$ or R—CO—NH—CH$_2$CH$_2$—N(CH$_3$)$_2$(+)—CH$_2$CH$_2$CH$_2$SO$_3^-$) or a hydroxysulfonic group (R—N(CH$_3$)$_2$(+)—CH$_2$CH(OH)—CH$_2$SO$_3^-$ or R—CO—NH—CH$_2$CH$_2$CH$_2$—N(CH$_3$)$_2$(+)—CH$_2$CH(OH)—CH$_2$SO$_3^-$ or R—CO—NH—CH$_2$CH$_2$—N(CH$_3$)$_2$(+)—CH$_2$CH(OH)—CH$_2$SO$_3^-$), such as $C_{10}$-$C_{18}$ dimethyl hydroxysultaine and $C_{10}$-$C_{18}$ amido propyl dimethylamino hydroxysultaine;

and mixtures thereof.

In preferred embodiments, the oil recovery formulation is substantially free of a surfactant.

Additives

The oil recovery formulation may optionally further include at least one additive selected from the group consisting of a viscosity modifying agent, a chelating agent, a stabilizing agent, a dispersing agent, a corrosion inhibitor, a scale inhibitor, a defoaming agent, and an emulsifier. Typically, when present, the additive(s) may be incorporated in an amount of up to 5 wt. %, preferably up to 4 wt. %, preferably up to 3 wt. %, preferably up to 2 wt. %, preferably up to 1 wt. %, preferably up to 0.5 wt. %, preferably up to 0.1 wt. %, preferably up to 0.05 wt. %, preferably up to 0.01 wt. %, based on a total weight of the oil recovery formulation.

Additive(s) suitable for use in oil and gas well operations, and particularly during oil recovery operations, are known by those of ordinary skill in the art, and may include, but are not limited to, viscosity modifying agents e.g., bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, polysaccharide gelling agents (e.g., xanthan gum, scleroglucan, and diutan) as well as synthetic polymer gelling agents (e.g., polyacrylamides and co-polymers thereof, see U.S. Pat. No. 7,621,334—incorporated herein by reference in its entirety), psyllium husk powder, hydroxyethyl cellulose, carboxymethylcellulose, and polyanionic cellulose, poly(diallyl amine), diallyl ketone, diallyl amine, styryl sulfonate, vinyl lactam, laponite;

chelating agents, such as chelating agents useful as sequestration agents of metal ions, for example iron control agents, such as ethylene diamine tetraacetic acid (EDTA), diethylene triamine pentaacetic acid (DPTA), hydroxyethylene diamine triacetic acid (HEDTA), ethylene diamine di-ortho-hydroxy-phenyl acetic acid (EDDHA), ethylene diamine di-ortho-hydroxy-para-methyl phenyl acetic acid (EDDHMA), ethylene diamine di-ortho-hydroxy-para-carboxy-phenyl acetic acid (EDDCHA);

stabilizing agents e.g., polypropylene glycol, polyethylene glycol, carboxymethyl cellulose, hydroxyethyl cellulose, polysiloxane polyalkyl polyether copolymers, acrylic copolymers, alkali metal alginates and other water soluble alginates, carboxyvinyl polymers, polyvinylpyrollidones, polyacrylates;

dispersing agents e.g., polymeric or co-polymeric compounds of polyacrylic acid, polyacrylic acid/maleic acid copolymers, styrene/maleic anhydride copolymers, polymethacrylic acid and polyaspartic acid;

a corrosion inhibitor e.g., alkoxylated fatty amines, chromates, zinc salts, (poly)phosphates, organic phosphorus compounds (phosphonates), acetylenic alcohols such as propargylic alcohol, α,β-unsaturated aldehydes such as cinnameldehyde and crotonaldehyde, aromatic aldehydes such as furfural, p-anisaldehyde, phenones including alkenyl phenones such as phenyl vinyl ketone, nitrogen-containing heterocycles such as imidazolines, piperazines, hexamethylene tetramines, quaternized heteroarenes such as 1-(benzyl)quinolinium chloride, and condensation products of carbonyls and amines such as Schiff bases;

scale inhibitors e.g., sodium hexametaphosphate, sodium tripolyphosphate, hydroxy ethylidene diphosphonic acid, aminotris(methylenephosphonic acid (ATMP), vinyl sulfonic acid, allyl sulfonic acid, polycarboxylic acid polymers such as polymers containing 3-allyloxy-2-hydroxy-propionic acid monomers, sulfonated polymers such as vinyl monomers having a sulfonic acid group, polyacrylates and co-polymers thereof;

defoaming agents e.g., silicone oils, silicone oil emulsions, organic defoamers, emulsions of organic defoamers, silicone-organic emulsions, silicone-glycol compounds, silicone/silica adducts, emulsions of silicone/silica adducts;

emulsifiers such as a tallow amine, a ditallow amine, or combinations thereof, for example a 50% concentration of a mixture of tallow alkyl amine acetates, C16-C18 (CAS 61790-60) and ditallow alkyl amine acetates (CAS 71011-03-5) in a suitable solvent such as heavy aromatic naphtha and ethylene glycol;

as well as mixtures thereof.

In some embodiments, the oil recovery formulation is substantially free of an additive (e.g., viscosity modifying agent, a chelating agent, a stabilizing agent, a dispersing agent, a corrosion inhibitor, a scale inhibitor, a stabilizing agent, a defoaming agent, and an emulsifier). In some embodiments, the oil recovery formulation is substantially free of polymers, including both water-soluble and oil-soluble polymers. In preferred embodiments, the oil recovery formulation is substantially free of a polysaccharide (e.g., xanthan gum, scleroglucan, and diutan) and a quaternary ammonium surfactant.

Oil Recovery Methods

The methods of the present disclosure generally relate to the recovery of hydrocarbons from a reservoir involving injection of the oil recovery formulation into the reservoir to aid/enhance recovery of hydrocarbons from the reservoir. The carboxylic acid functionalized-pyrolyzed date leaf particles may be particularly useful when combined with an aqueous base fluid and any optional additives (to form the oil recovery formulation) for use in secondary recovery processes such as waterflooding or surfactant flooding processes, or in tertiary recovery processes such as enhanced oil recovery (e.g., chemical injection EOR). As used herein, the term "waterflooding" refers to a method of oil recovery in which water or a fluid is injected into a petroleum reservoir to sweep and displace mobile oil from a subterranean geological formation. The water injected increases pressure within the reservoir, replenishing the natural reservoir pressure that has been previously depleted in primary recovery, and physically sweeps the displaced mobile oil to adjacent production wells. Generally, the water or fluid used in a waterflooding process is taken from nearby water sources, and is usually natural seawater, fresh water, produced water, aquifer water, river water, artificial saline water or brine. "Surfactant flooding" is a technique used to increase oil production by injection of surfactants to reduce the interfacial tension (IFT) between oil and the displacing fluid. Surfactants may improve rock wettability, allow water to move faster, and ultimately enhance oil displacement. Chemical EOR is an oil recovery enhancement method that is designed to alter the original properties of oil. While typically carried out after secondary recovery, the techniques employed during enhanced oil recovery can be initiated at any time during the productive life of an oil reservoir. The purpose of EOR is to restore formation pressure and improve oil displacement or fluid flow in the reservoir. In preferred embodiments, the oil recovery formulation is used for enhanced oil recovery operations.

The carboxylic acid functionalized-pyrolyzed date leaf particles and any optional additives may be added/combined with the aqueous base fluid using any addition/dosing/mixing techniques known by those of ordinary skill in the art, including both manual and automatic addition techniques. For example, the addition may be carried out by using inline static mixers, inline mixers with velocity gradient control, inline mechanical mixers with variable speed impellers, inline jet mixers, motorized mixers, batch equipment, and appropriate chemical injection pumps and/or metering systems. The chemical injection pump(s) can be automatically or manually controlled to inject any amount of the carboxylic acid functionalized-pyrolyzed date leaf particles suitable for promoting oil secondary and/or tertiary oil recovery.

In any of the above applications, the oil recovery formulation may be injected down the annulus of a well. The method may be performed by injecting the oil recovery formulation into a first wellbore (e.g. an injection wellbore) connected to the reservoir and then collecting hydrocarbons from a second wellbore (e.g. a production wellbore) that is connected to the reservoir. Alternatively, the method may be performed by injecting the oil recovery formulation into a wellbore connected to the reservoir, and then collecting hydrocarbons from the same wellbore. In some embodiments, the oil recovery formulation is pre-formed above the well by combining the carboxylic acid functionalized-pyrolyzed date leaf particles and the aqueous base fluid, and any optional components (e.g., surfactant, acrylamide-based polymer) followed by injecting the pre-formed oil recovery formulation downhole for the oil recovery operation. In some embodiments, the carboxylic acid functionalized-pyrolyzed date leaf particles in the aqueous base fluid, and a solution/suspension of surfactant and/or acrylamide-based polymer are injected downhole as separate streams, combining downhole to form the oil recovery formulation.

Injection may proceed through suitable injection lines to areas where additional oil recovery (i.e., after primary recovery) is desired through capillaries or umbilical lines. Injection may be performed manually or it may be automatic, for example, by using chemical injection pumps. In some embodiments, the oil recovery formulation may be stored in a chemical storage tank and a chemical injection pump associated therewith may be used to introduce the oil recovery formulation into the desired location of the operation. In any of the above applications, the oil recovery formulation or any of its components combinable downhole may be injected continuously and/or in batches. The chemical injection pump(s) can be automatically or manually controlled to inject any amount of the oil recovery formulation needed for secondary and/or tertiary oil recovery operations.

Injection pressures and flow rates of the composition may be kept constant or varied. In some embodiments, the injection pressure of the oil recovery formulation is up to 3,000 psi, preferably 25 to 3,000 psi, preferably 50 to 2,000 psi, preferably 50 to 1,000 psi, preferably 75 to 800 psi, preferably 100 to 600 psi. In some embodiments, the injection flow rate of the oil recovery formulation is 0.1 to 50 mL/min, preferably 0.5 to 20 mL/min, preferably 1 to 10 mL/min.

The amount of oil recovery formulation injected may vary depending on the well set-up, the formation type, the type of oil to be displaced, the type of recovery (e.g., secondary versus tertiary), the oil recovery desired, and many other factors, and an oilfield technician of ordinary skill can determine the appropriate amount of the oil recovery formulation to inject to suit a particular recovery operation. In some embodiments, the amount of oil recovery formulation injected is from 1 to 5 pore volumes, preferably 1.2 to 4.8 pore volumes, preferably 1.4 to 4.6 pore volumes, preferably 1.6 to 4.4 pore volumes, preferably 1.8 to 4.2 pore volumes, preferably 2 to 4 pore volumes, preferably 2.2 to 3.8 pore volumes, preferably 2.4 to 3.6 pore volumes, preferably 2.6 to 3.4 pore volumes, preferably 2.8 to 3.2 pore volumes, preferably 3 to 3.1 pore volumes. Alternatively, an amount of the oil recovery formulation may be injected into the reservoir to provide a critical micelle concentration (CMC) of the carboxylic acid functionalized-pyrolyzed date leaf particles as described heretofore.

The method disclosed herein may be particularly suitable for supplementing primary (natural) and secondary recoveries. For example, an oil recovery process may include an initial flooding of a reservoir with 0.5 to 3 pore volumes (PVs) of water, which may be natural seawater, fresh water, produced water, aquifer water, river water, artificial saline water or brine (waterflooding), followed by at least a single injection of the oil recovery formulation described herein, for example in the amounts described above. The initial waterflooding may recover up to 40% of a reservoir's original oil in place, preferably 5 to 37%, preferably 10 to 30%, while the injection of the oil recovery formulation may recover a further 20 to 40% of the reservoir's original oil in place, preferably 22 to 35%, preferably 25 to 30%.

The oil recovery formulation used herein may substantially increase the yield of hydrocarbons from underground reservoirs such as carbonate reservoirs (e.g., predominantly limestone) or sandstone reservoirs (e.g., primarily siliclastic rocks and clay), and may be particularly useful for increasing yield of hydrocarbons in reservoirs of high temperature water sources, high salinity water sources, or high temperature/high salinity water sources, for example, from carbonate reservoirs. Alternatively, the reservoir may be a tight shale reservoir formed by hydraulic fracturing. In some embodiments, the reservoir has a temperature of 20 to 300° C., preferably 30 to 250° C., preferably 50 to 200° C., preferably 60 to 180° C., preferably 75 to 160° C., preferably 90 to 140° C., preferably 100 to 120° C.

The hydrocarbon displaced from the reservoir herein, and subsequently collected, is preferably a crude oil. The crude oil may be a very light crude oil such as Arab Extra Light, Arab Super Light, or Arab Super Light Ardjuna crude oil (e.g., a jet fuel, gasoline, kerosene, petroleum ether, petroleum spirit, or petroleum naphtha crude oil), a light crude oil such as Arab Light or Arab Light/Seg 17 Blend crude oil (e.g., grade 1 and grade 2 fuel oil, diesel fuel oil, domestic fuel oil), a medium crude oil such as Arab Medium crude oil, and a heavy crude oil such as Arab Heavy crude oil (e.g., grade 3, 4, 5, and 6 fuel oil, heavy marine fuel). Both sweet (sulfur volume lower than 0.50%) and sour (sulfur volume higher than 0.50%) crude oils may be displaced and recovered/collected according to the methods herein.

In preferred embodiments, the crude oil is a light or medium crude oil, preferably a light crude oil, preferably Arabian Light crude oil, preferably Arabian Light crude oil having a density at 25° C. of 0.81 to 0.83 g/mL, preferably 0.815 to 0.8298 g/mL, preferably 0.82 to 0.8296 g/mL, preferably 0.822 to 0.8294 g/mL, preferably 0.824 to 0.829 g/mL, preferably 0.826 to 0.8288 g/mL, preferably 0.828 to 0.8286 g/mL.

After the injecting, a mixture of the oil recovery formulation and the crude oil (e.g., Arab Light crude oil) is formed, which may then be brought to the surface for collection. Preferably, the mixture of the oil recovery formulation and the crude oil has a reduced interfacial tension (IFT) compared to the IFT of the crude oil alone. In some embodiments, the mixture of the oil recovery formulation and the crude oil has an interfacial tension of 8 to 13 dyne/cm, preferably 8.1 to 12 dyne/cm, preferably 8.2 to 11 dyne/cm, preferably 8.3 to 10 dyne/cm, preferably 8.4 to 9.5 dyne/cm, preferably 8.5 to 9 dyne/cm, preferably 8.56 to 8.9 dyne/cm, as determined for example according to ASTM D971-99a— which is incorporated herein by reference in its entirety.

After the injecting, the hydrocarbon (e.g., crude oil)/water mixture brought to the surface may then be separated using techniques known to those of ordinary skill in the art into respective aqueous and oil phases for further processing (e.g., crude oil refining/upgrading/processing). For example, the oil/water mixture may be separated at a fluids processing facility using emulsion breakers, water clarifiers, and/or other oil/water separation techniques known to those of ordinary skill in the art, such as by using gravity oil separators (API separators), plate separators or coalescing plate separators, separatory funnels, settling tanks, centrifugal separation (e.g., centrifugal water-oil separators, centrifugal settling devices, dewatering centrifuges), decanters, induced gas floatation such using microbubble technology, and skimming equipment.

Having generally described this disclosure, a further understanding can be obtained by reference to certain specific examples which are provided herein for purposes of illustration only and are not intended to be limiting unless otherwise specified.

Where a numerical limit or range is stated herein, the endpoints are included. Also, all values and subranges within a numerical limit or range are specifically included as if explicitly written out.

The present disclosure also contemplates other embodiments "comprising", "consisting of" and "consisting essentially of", the embodiments or elements presented herein, whether explicitly set forth or not.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

To develop nanoparticles from date leaves that can be applied in enhanced oil and gas recovery operations, date-leaf carbon micro-nanostructured particles (DLCMNPs) were prepared from date leaves using a pyrolysis method. After that, to make the DLCMNPs water soluble for EOR applications, carboxylic acid functionalization was performed by acid treatment to form carboxylic acid functionalized-pyrolyzed date leaf particles, also referred to as "carboxylated date-leaf carbon micro-nanostructured carbon particles" or "CDLCMNPs".

Methodology

Preparation Method of Carboxylated Date-Leaf Carbon Micro-Nanostructured Particles Step 1: Collection of Leaves Date leaves were collected from a date garden in front of the Research Institute (RI) at the King Fand University of Petroleum and Minerals, Saudi Arabia.

Step 2: Cut and Dry

The collected date leaves were cut into small pieces with chopper and then cleaned with de-ionised (DI) water and dried at 110° C. in an oven for 24 h.

Step 3: Pulverisation

The dried leaves were made into a powder using a cooking blender machine and then the powders were mixed with $NaHCO_3$ in a mortar with a mass ratio of 1:4.

Step 4: Formation of Carbon (Pyrolysis)

The mixed powders were placed in the middle of tube furnace. The powders were heated at 850° C. for 5 hours under nitrogen atmosphere. The heating rate and cooling rate were 5° C./min and 10° C./min, respectively. Then the obtained carbon material was washed twice with 0.5 HCl, washed with deionized water, and dried at 60° C. overnight to obtain the date-leaf carbon micro-nanostructured particles (DLCMNPs) formed from porous carbon nano-sheets.

Step 5: Carboxylation of the Date Leaf-Derived Carbon

Firstly, 500 g of DLCMNPs was added into a 250 ml of solution of $H_2SO_4$ and $HNO_3$. The ratio of $H_2SO_4$ and $HNO_3$ in the solution was 3:1 by volume (both acids were concentrated and obtained from Sigma-Aldrich). After that, the solution was transferred to an ultrasonicator. Next, ultrasonication was performed for 5 hours to form the carboxylic acid groups and the reaction mass was diluted with water. The diluted masses were held for eight hours to form separate layer between the carboxylated carbon product and mother liquor. Then upper part of the diluted solution (mother liquor) was transferred into another beaker via decantation. The dilution and decantation procedure was repeated six times. Finally, the carboxylic acid functionalized carbon product was dried at 60° C. for 24 hours. It is denoted as carboxylated date-leaf carbon micro-nanostructured carbon particles (CDLCMNPs).

Morphological and Chemical Compositional Characterization of the CDLCMNPs

Field emission scanning electron microscopy (FESEM) images analysis were performed using the field emission SEM (TESCAN LYRA 3, Czech Republic). Energy dispersive X-ray spectroscopy (EDS) spectrum was recorded using Xmass detector, Oxford instrument equipped with the Lyra3 TESCAN FESEM. Transmission electron microscopic (TEM), high resolution TEM and selected area diffraction (SAED) pattern analysis were performed using transmission electron microscope (JEOL JEM 2100F).

X-ray photoelectron spectroscopic (XPS) analysis was performed using an Al-Kα micro-focusing X-ray monochromator (ESCALAB 250Xi XPS Microprobe, Thermo Scientific, USA).

Determination of Interfacial Tension (IFT) and Critical Micelle Concentration (CMC)

A. Methodology

IFT was measured between Arabian light crude oil and date-leaf solution at different concentrations by using ASTM D971-99a described briefly below.

B. Apparatus (1) Arabian light crude oil ($\rho_{@25°C.}=0.8286$ g/cc), (2) Date-Leaf particle samples at different weight concentrations, (3) Sigma 702 Force Tensiometer, (4) Densitometer, (5) Heater, (6) Du Noüy ring, (7) Distilled water, (8) Chemical dissolvent: Naphtha, Ethyl-methyl ketone and acetone, (9) Bunsen burner and (10) Thermometer.

C. Experimental Procedure

IFT measurements between Arab light crude and CDLC-MNPs samples were conducted by using the following steps:

1. Glass containers were cleaned by using the following chemical dissolvent: Naphtha, Ethel-methyl ketone and acetone. Then, they were also rinsed by tap water and distilled water. After that, these glass containers were dried and covered by aluminum paper to keep them clean.
2. Du Noüy ring was cleaned by Naphtha, Ethyl-methyl ketone and acetone chemical dissolvent. Then it was flamed by butane gas flame for no more than 5 seconds until it barely glows orange. Ring dimension is presented in Table 1.
3. Density of samples and crude oil were measured at 25° C. to find density difference the two different phases. Densities are given in Table 2.
4. Heater was connected to the tensiometer and was set at 25° C.
5. The calibration of tensiometer and the cleaning of glass containers were checked by measuring surface tension of distilled water at 25° C. and it must be between 71-73 dyne/cm. If the value of surface tension was low then there is a problem either in the calibration or in the cleaning of the glass containers.
6. Each sample was poured into a clean glass container to a depth of 10-15 mm, and was waited usually more than 12 minutes until temperature of the sample reaches 25° C.
7. The ring was immersed in the sample such that its depth is less than 6 mm. Then, the heavy phase was carefully covered with crude oil such that its depth is more than 10 mm.
8. The sample-oil interface was lifted to age for 30 seconds. Then, the platform was lowered until the rupture value was recorded.
9. IFT measurements were corrected with a build-in software inside Sigma 702 force tensiometer. Method of correction was using the Zuidema and Waters correction factor.

D. Data

TABLE 1

| Ring dimensions | |
|---|---|
| Circumference of ring C, mm | 60.1 |
| Radius of the ring/radius of wire (R/r) | 53.8384846 |

TABLE 2

| | Density measurements at 25° C. | | | | | | |
|---|---|---|---|---|---|---|---|
| Sample | H$_2$O | Oil | 100 PPM | 200 PPM | 400 PPM | 600 PPM | 800 PPM |
| ρ@25° C. gm/cc | 0.9970 | 0.8286 | 0.99718 | 0.99722 | 0.99725 | 0.99730 | 0.99735 |
| Delta ρ@25° C. gm/cc | — | — | 0.16858 | 0.16862 | 0.16865 | 0.16870 | 0.16875 |

Note:
delta ρ is the density difference between heavy and light phases.

Results and Discussion:

Field Emission Scanning Electron Microscope (FESEM) and Energy Dispersive Spectroscopy (EDS)

Figure 1C:
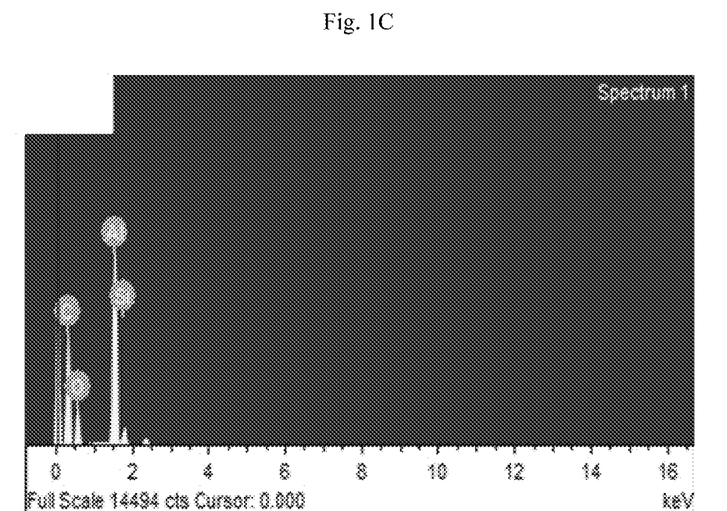
FIG. 1C is an EDS spectrum of the marked area (box) of FIG. 1B.

FIGS. 1A and 1B present the SEM images of the prepared carboxylated carbon (CDLCMNPs). FIG. 1A shows the size of the carbon particles are in the range of few μm to 20 μm. FIG. 1A clearly shows that the carbon is porous in nature and contains nanosheets. It indicates that the carbon particles are micro-nanostructured (i.e., the micro-particles are composed from nanosheets). As a result this carbon is denoted as CDLCMNPs i.e., carboxylated date-leaf carbon micro-nanostructured carbon particles. FIG. 1C is the EDS spectrum of the carboxylated porous carbon (CDLCMNPs). The spectrum shows the presence of C, O Si, and Al. C, O, Si peaks appeared from the carboxylated carbon sample. The source of Al peak is alumina substrate as the carboxylated porous carbon was immobilized on alumina before recording EDS spectrum. It indicates that the CDLCMNPs are composed of carbon (71.52 wt. %) and oxygen (21.64 wt. %) and silica (0.63 wt. %).

TEM and SAED

Figure 2A:
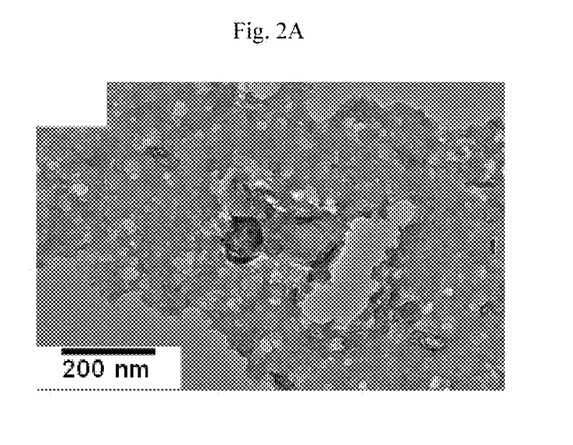
FIG. 2A is a TEM image of the CDLCMNPs.
Figure 2B:
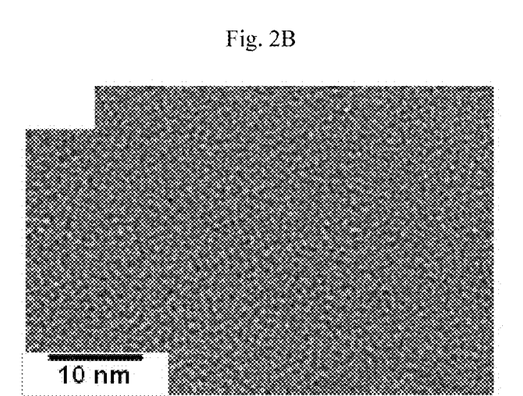
FIG. 2B is a HRTEM image of the CDLCMNPs.
Figure 2C:
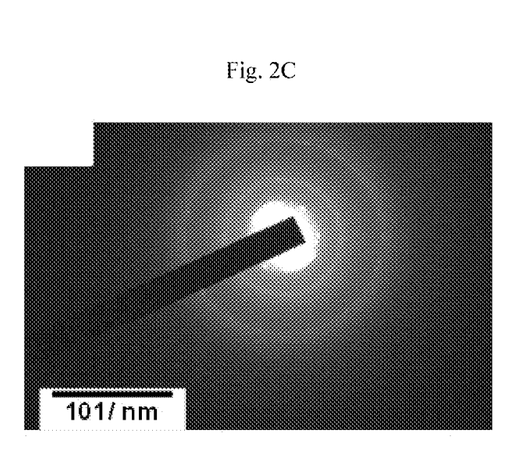
FIG. 2C is a SAED pattern of the CDLCMNPs.

To determine the morphologies of prepared CDLCMNPs, the transmission electron microscopic (TEM) (FIG. 2A) and high resolution TEM (FIG. 2B) images were recorded. The TEM images clearly show that the particles are porous in nature and contain nanosheets. This observation is similar to observation in the FESEM analysis. The HRTEM image clearly shows the presence of lot of micro- and mesopores in the prepared CDLCMNPs. The selected area diffraction (SAED) pattern shows that the CDLCMNPs is crystalline in nature.

XPS Analysis

Figure 3A:
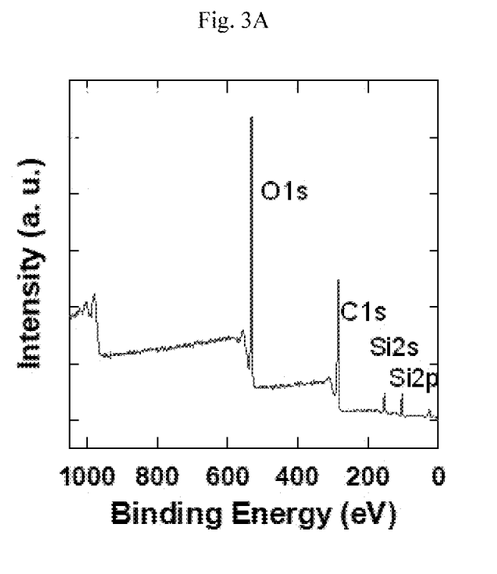
FIG. 3A is graph of the XPS survey of the CDLCMNPs.
Figure 3B:
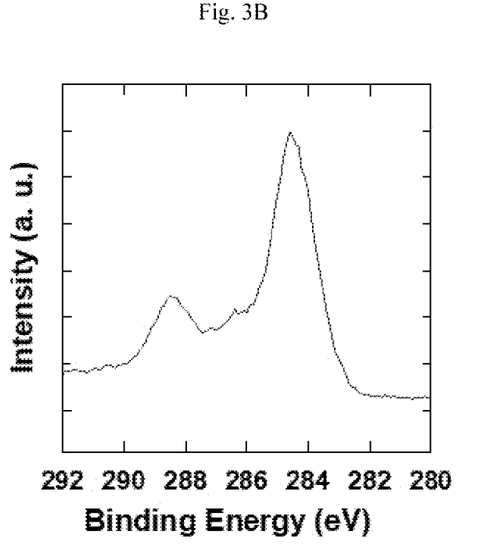
FIG. 3B is a graph of the C1s spectrum of the CDLCM-NPs.

The survey spectrum (FIG. 3A) of the CDLCMNPs confirms the presence of Si, C and O which is similar to the observation of EDS analysis. The typical C1s peaks (284.6 and 288.50) (FIG. 3B) clearly confirm the presence of carboxylic groups in CDLCMNPs (Aziz, M. A.; and Yang, H., "Surfactant and polymer-free electrochemical micropatterning of carboxylated multi-walled carbon nanotubes on indium tin oxide electrodes", 2008, Chem. Commun. 826-828—incorporated herein by reference in its entirety).

IFT measurements and CMC determination at 25° C.

Six samples of CDLCMNPs at concentrations from 100 mg/l to 800 mg/l and deionized distilled water were prepared, and IFT values were measured by the ASTM D971-

Figure 4:
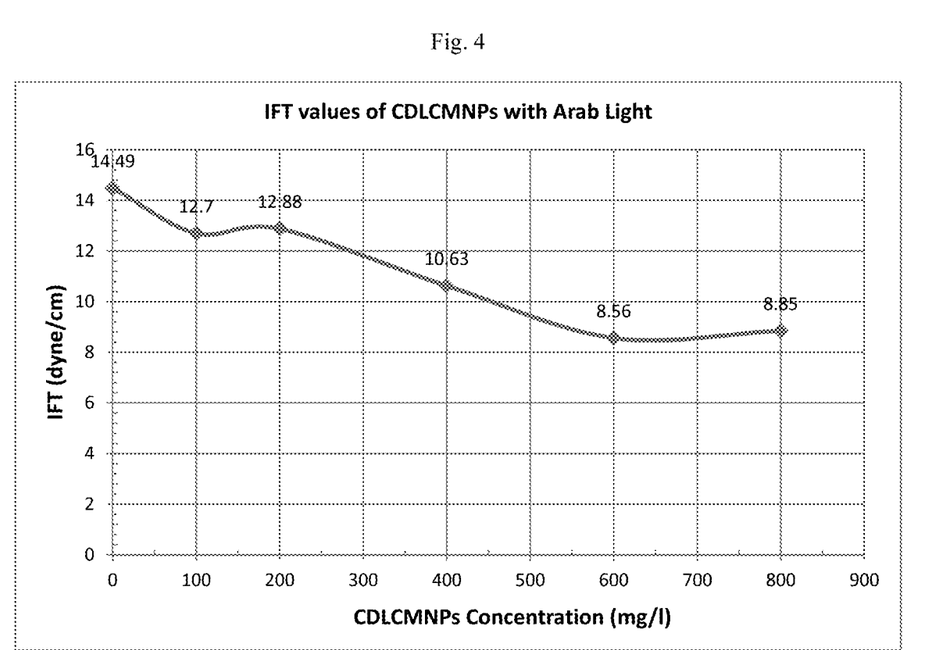
FIG. 4 is a graph showing the interfacial tension (IFT) reduction using CDLCMNPs at concentrations from 0 mg/l to 800 mg/l with Arab Light crude under laboratory conditions.
Figure 5:
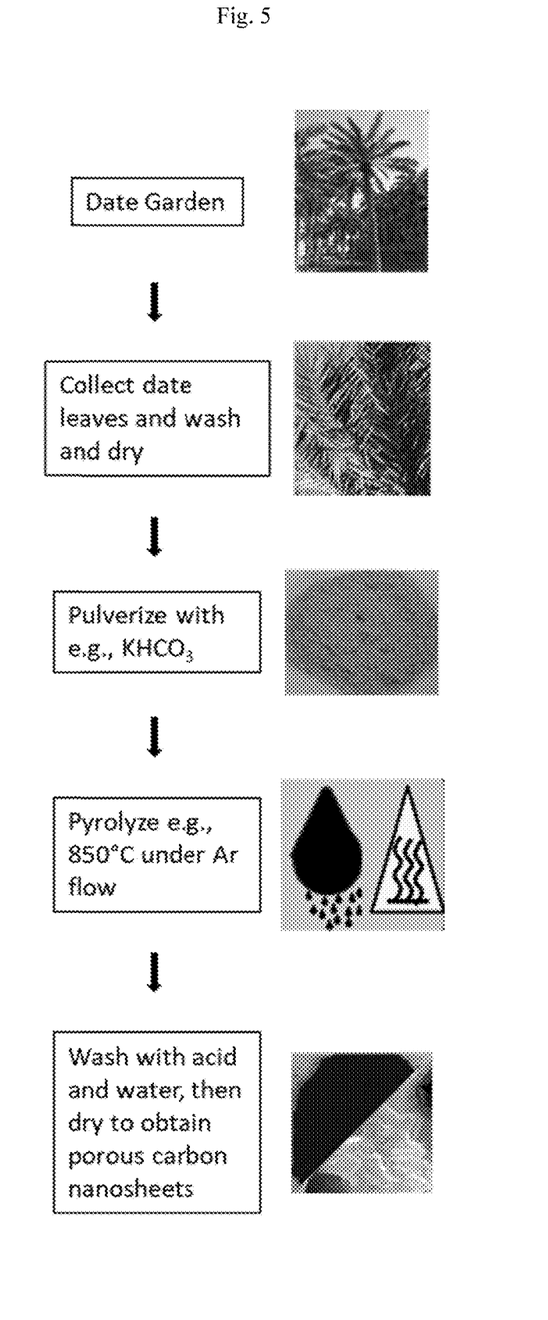
FIG. 5 is a flowchart for the preparation of date-leaf carbon micro-nanostructured particles (DLCMNPs) from date leaves.

99a method, described previously. The Arab Light crude oil ($\rho_{@25°C.}$=0.8286 g/cc) was obtained from Saudi Aramco. The IFT values are tabulated in Table 3 and plotted against the CDLCMNPs concentration in FIG. 4. The first value on the plot was 0.00 mg/l of CDLCMNPs concentration, equal to 14.49 dyne/cm. The IFT decreased to 8.56 dyne/cm as the CDLCMNPs concentration increased to 600 mg/l. Between 600 mg/l and 800 mg/l, IFT did not decrease but slightly increased to 8.85 dyne/cm. As IFT did not decrease with the increase of CDLCMNPs concentration after 600 mg/l, the CMC most likely is 600 mg/l.

TABLE 3

IFT values of CDLCMNPs at different concentrations

| CDLCMNPs concentration (mg/l) | IFT dyne/cm |
| --- | --- |
| 0 | 14.49 |
| 100 | 12.7 |
| 200 | 12.88 |
| 400 | 10.63 |
| 600 | 8.56 |
| 800 | 8.85 |

Applications in Oil and Gas Industry and Conclusions

Field Emission Scanning Electron Microscope (FESEM) and Energy Dispersive Spectroscopy (EDS) revealed that the carbon particles are in the range of few μm to 20 μm and are micro-nanostructured (i.e., the micro-particles are composed from nanosheets).

The TEM images indicated that the particles containing nanosheets were porous in nature. The selected area diffraction (SAED) pattern showed that the CDLCMNPs are crystalline in nature.

XPS analysis of the CDLCMNPs found that the presence of Si, C and O which was similar to the observation of EDS analysis. It also confirmed that the CDLCMNPs were carboxylate functionalized.

IFT between Arab Light crude oil ($\rho_{@25°C.}$=0.8286 g/cc) and different concentrations of CDLCMNPs solutions with distilled water were measured. It was discovered that the CDLCMNPs reduced IFT about 41% from 14.46 to 8.56 dyne/cm at 25° C.

IFT measurements confirmed that the critical micelle concentration (CMC) was found at 600 ppm where IFT value was 8.56 dyne/cm.

The CDLCMNPs could be applicable to improve recovery in the following areas: IFT reduction, wettability alteration, rheology, smart water technology, and EOR and EGR.

The invention claimed is:

1. A method of recovering a hydrocarbon from a reservoir, comprising:
injecting an oil recovery formulation into the reservoir, wherein the oil recovery formulation comprises carboxylic acid functionalized-pyrolyzed date leaf particles; and
collecting the hydrocarbon from the reservoir.

2. The method of claim 1, wherein the carboxylic acid functionalized-pyrolyzed date leaf particles are obtained from date leaves, sequentially, by cutting the date leaves and drying at 90 to 140° C., pulverizing in the presence of a metal bicarbonate, pyrolyzing at 700 to 1,000° C. to form pyrolyzed date leaf particles, and treating the pyrolyzed date leaf particles with an acid solution comprising nitric acid to introduce carboxylic acid functional groups and form the carboxylic acid functionalized-pyrolyzed date leaf particles.

3. The method of claim 1, wherein the carboxylic acid functionalized-pyrolyzed date leaf particles are in the form of microparticles having an average particle size of 2 to 20 μm.

4. The method of claim 3, wherein the microparticles are composed of nanostructured sheets having an average particle size of 50 to 500 nm.

5. The method of claim 1, wherein the carboxylic acid functionalized-pyrolyzed date leaf particles comprise 65 to 75 wt. % carbon, 15 to 25 wt. % oxygen, and 0.3 to 1.5 wt. % silicon, each based on a total weight of the carboxylic acid functionalized-pyrolyzed date leaf particles.

6. The method of claim 1, wherein the carboxylic acid functionalized-pyrolyzed date leaf particles have a degree of carboxylic acid functionalization of 4 to 18 wt. %, as determined by X-ray photoelectron spectroscopic analysis.

7. The method of claim 1, wherein the carboxylic acid functionalized-pyrolyzed date leaf particles are porous with a hierarchical pore structure.

8. The method of claim 7, wherein the carboxylic acid functionalized-pyrolyzed date leaf particles have an average pore diameter of 1 to 10 nm.

9. The method of claim 1, wherein the carboxylic acid functionalized-pyrolyzed date leaf particles have a solubility in water of 0.1 to 5 mg per mL of water.

10. The method of claim 1, wherein the carboxylic acid functionalized-pyrolyzed date leaf particles are present in the oil recovery formulation in an amount of 50 to 1,000 ppm, based on a total weight of the oil recovery formulation.

11. The method of claim 1, wherein the carboxylic acid functionalized-pyrolyzed date leaf particles have a critical micelle concentration in water of 500 to 700 ppm.

12. The method of claim 1, wherein, besides the carboxylic acid functionalized-pyrolyzed date leaf particles, the oil recovery formulation is substantially free of carbonaceous materials.

13. The method of claim 1, wherein the oil recovery formulation is substantially free of an organic solvent, an acrylamide-based polymer, and a surfactant.

14. The method of claim 1, wherein the oil recovery formulation further comprises at least one additive selected from the group consisting of a viscosity modifying agent, a chelating agent, a stabilizing agent, a dispersing agent, a corrosion inhibitor, a scale inhibitor, a defoaming agent, and an emulsifier.

15. The method of claim 1, wherein the oil recovery formulation further comprises an aqueous base fluid having a total dissolved solids content of less than 1,000 mg/L.

16. The method of claim 1, wherein the oil recovery formulation further comprises an aqueous base fluid having a total dissolved solids content of 10,000 mg/L to 400,000 mg/L.

17. The method of claim 1, wherein the reservoir has a temperature of 20 to 300° C.

18. The method of claim 1, wherein the reservoir is a carbonate reservoir.

19. The method of claim 1, wherein the hydrocarbon is an Arab Light crude oil, and the method is an enhanced oil recovery method.

20. The method of claim 19, wherein the injecting forms a mixture of the oil recovery formulation and the Arab Light crude oil with an interfacial tension of 8 to 13 dyne/cm.

* * * * *